(12) United States Patent
Zheng et al.

(10) Patent No.: US 8,723,125 B1
(45) Date of Patent: May 13, 2014

(54) WAVEGUIDE END-COUPLED INFRARED DETECTOR

(71) Applicant: LaXense Inc., Walnut, CA (US)

(72) Inventors: Dawei Zheng, Irvine, CA (US);
Ningning Feng, Arcadia, CA (US);
Xiaochen Sun, Pomona, CA (US)

(73) Assignee: Laxense Inc., Walnut, CA (US)

( * ) Notice: Subject to any disclaimer, the term of this patent is extended or adjusted under 35 U.S.C. 154(b) by 0 days.

(21) Appl. No.: 13/670,254

(22) Filed: Nov. 6, 2012

(51) Int. Cl.
*G01J 5/02* (2006.01)

(52) U.S. Cl.
USPC ............................................ 250/340

(58) Field of Classification Search
USPC ............................................ 250/340
See application file for complete search history.

(56) References Cited

U.S. PATENT DOCUMENTS

| | | | |
|---|---|---|---|
| 6,587,632 B2 | 7/2003 | Min et al. | |
| 6,853,793 B1 | 2/2005 | Van der Vliet et al. | |
| 7,120,350 B2 | 10/2006 | Block et al. | |
| 7,515,793 B2 * | 4/2009 | Dehlinger et al. | 385/40 |
| 8,053,790 B2 | 11/2011 | Feng et al. | |

OTHER PUBLICATIONS

Vivien et al., "42 GHz p.i.n Germanium photodetector integrated in a silicon-on-insulator waveguide", Optics Express, Apr. 13, 2009, pp. 6252-6257, vol. 17, No. 8.
Yin et al., "31 GHz Ge n-i-p waveguide photodetectors on Silicon-on-Insulator substrate", Optics Express, Oct. 17, 2007, pp. 13965-13971, vol. 15, No. 21.
Ahn et al., "High performance, waveguide integrated Ge photodetectors", Optics Express, Apr. 2, 2007, pp. 3916-3921, vol. 15, No. 7.
Feng et al., "Vertical p-i-n germanium photodetector with high external responsivity integrated with large core Si waveguides", Optics Express, Jan. 4, 2010, pp. 96-101, vol. 18, No. 1.
Feng et al., "High-speed Ge photodetector monolithically integrated with large cross-section silicon-on-insulator waveguide", Applied Physics Letters, 2009, pp. 261105-1-261105-3, No. 95.

* cited by examiner

*Primary Examiner* — Kiho Kim
(74) *Attorney, Agent, or Firm* — Chen Yoshimura LLP

(57) ABSTRACT

A Ge waveguide photo-detector fabricated on a silicon-on-insulator substrate is provided. It comprises a Ge waveguide detector end-coupled to a light-signal-carrying silicon waveguide, both disposed on a silicon-on-insulator (SOI) substrate. An electrical field is established along the direction of light propagation inside the Ge waveguide detector by doping the two opposite ends of the Ge detector with P or N type dopants. In result the height and width of the Si waveguide is decoupled from the speed of the Ge detector.

20 Claims, 14 Drawing Sheets

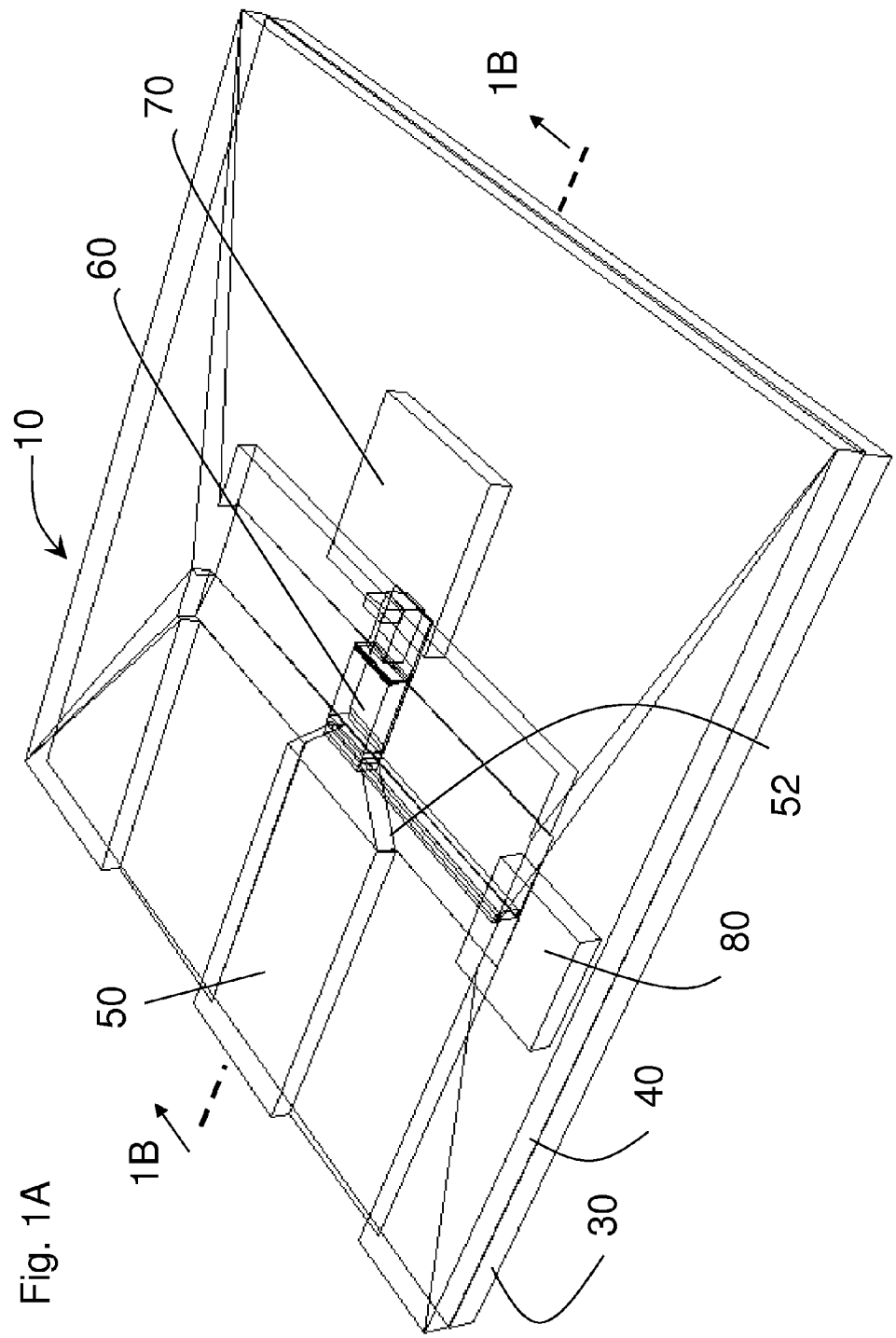

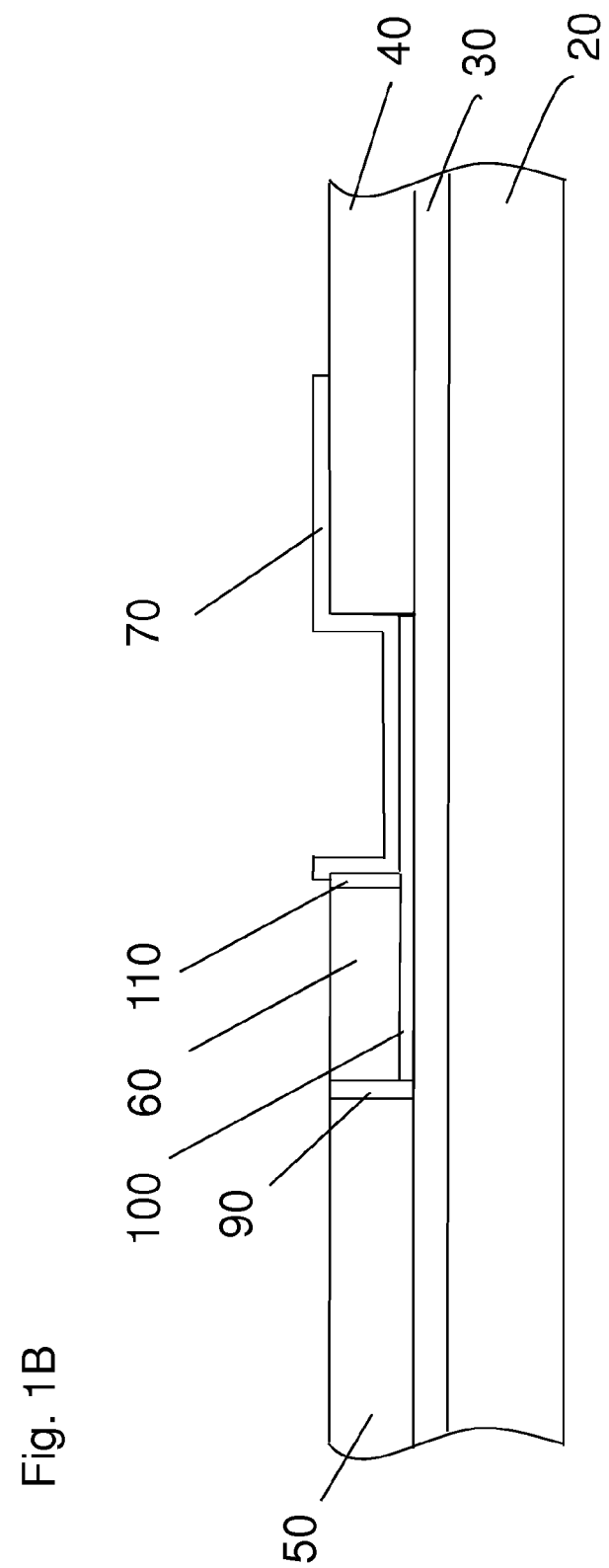

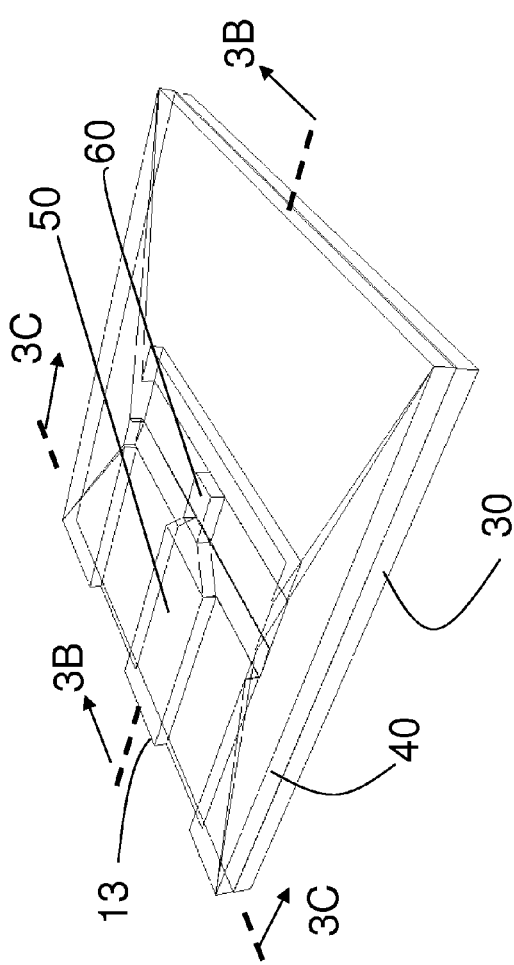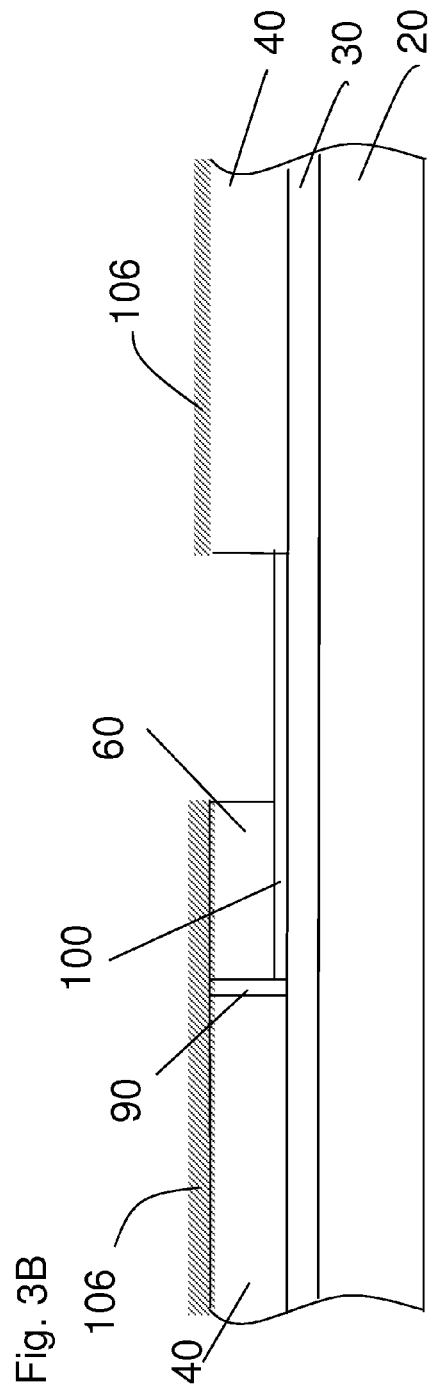

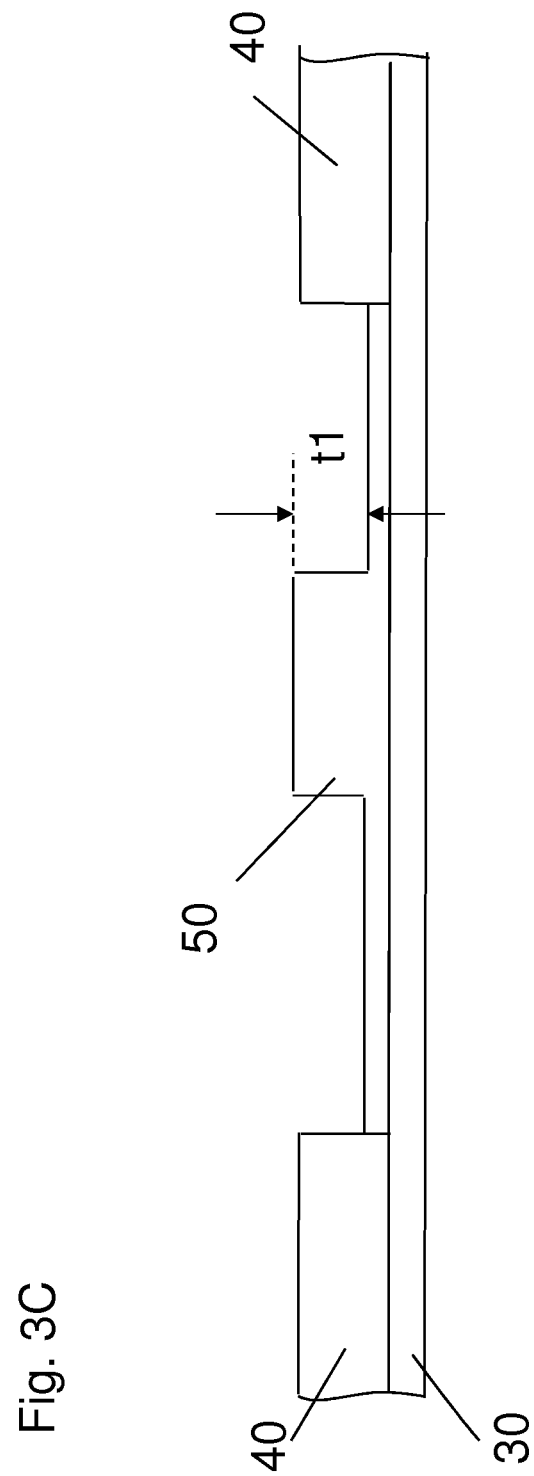

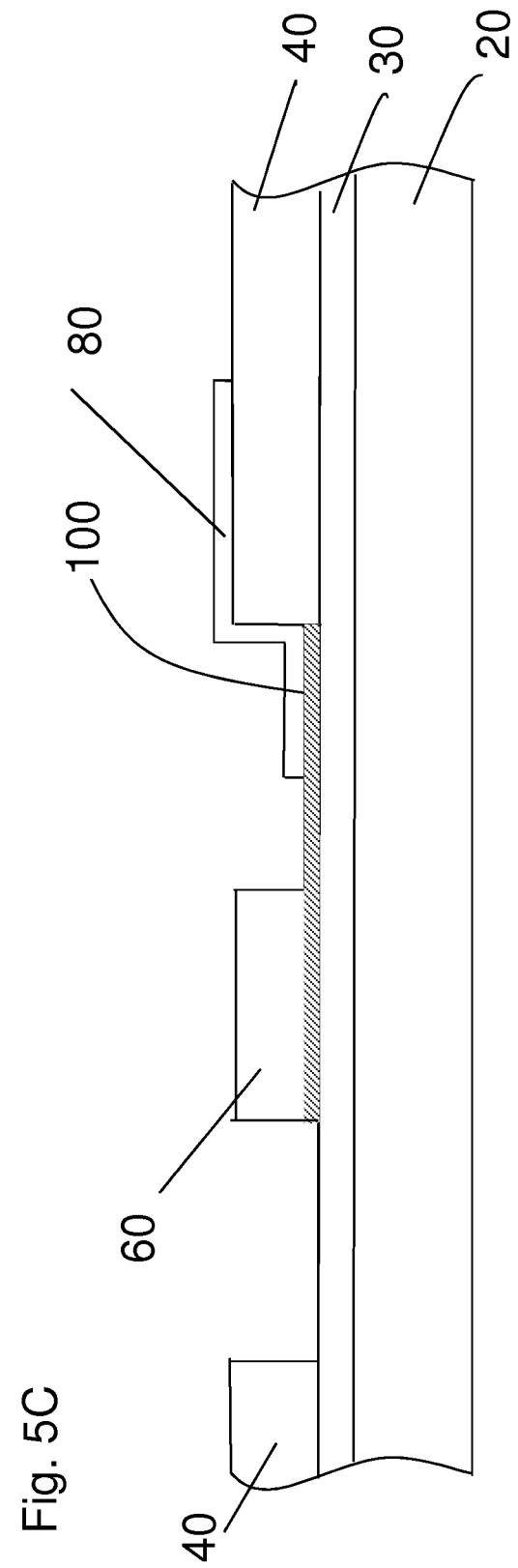

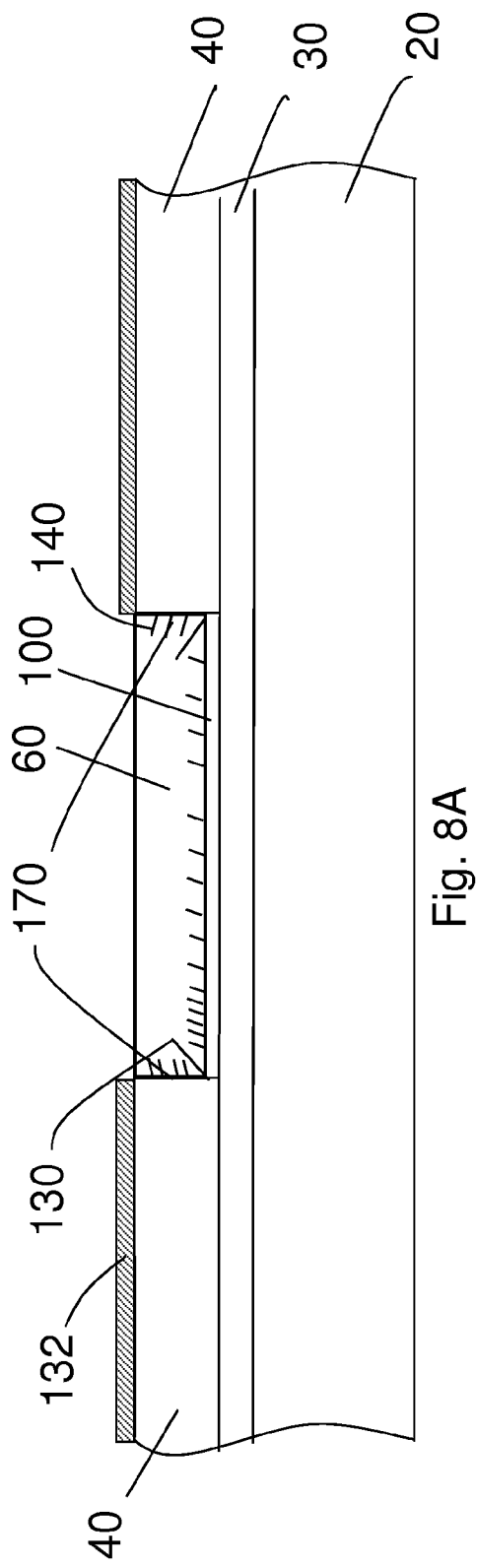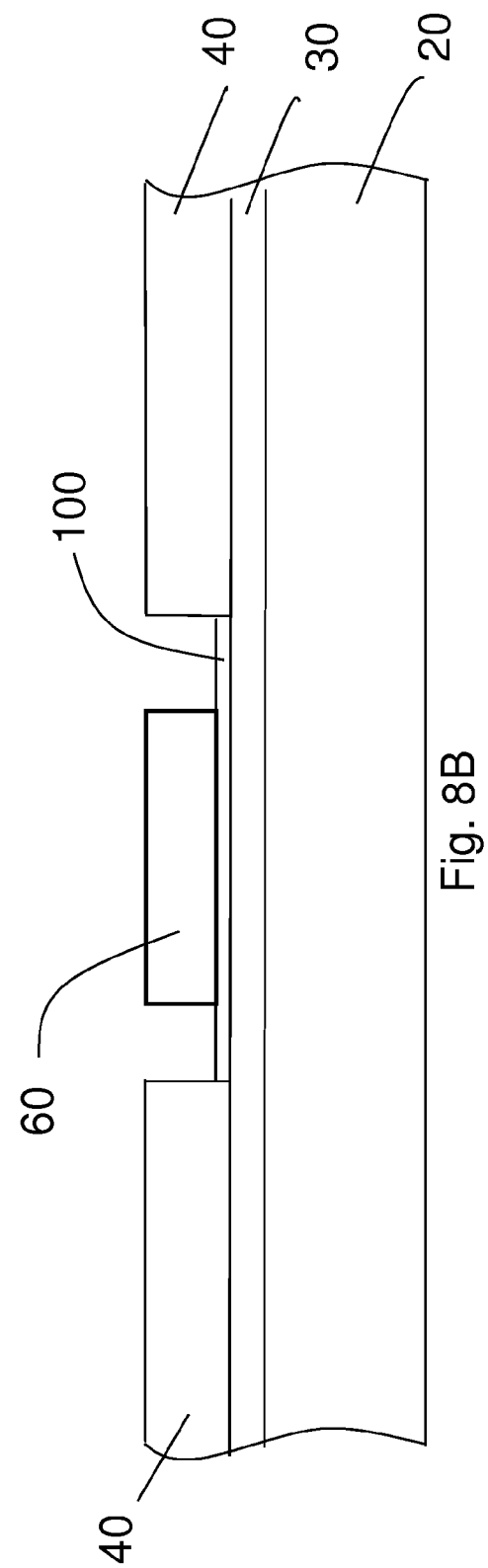

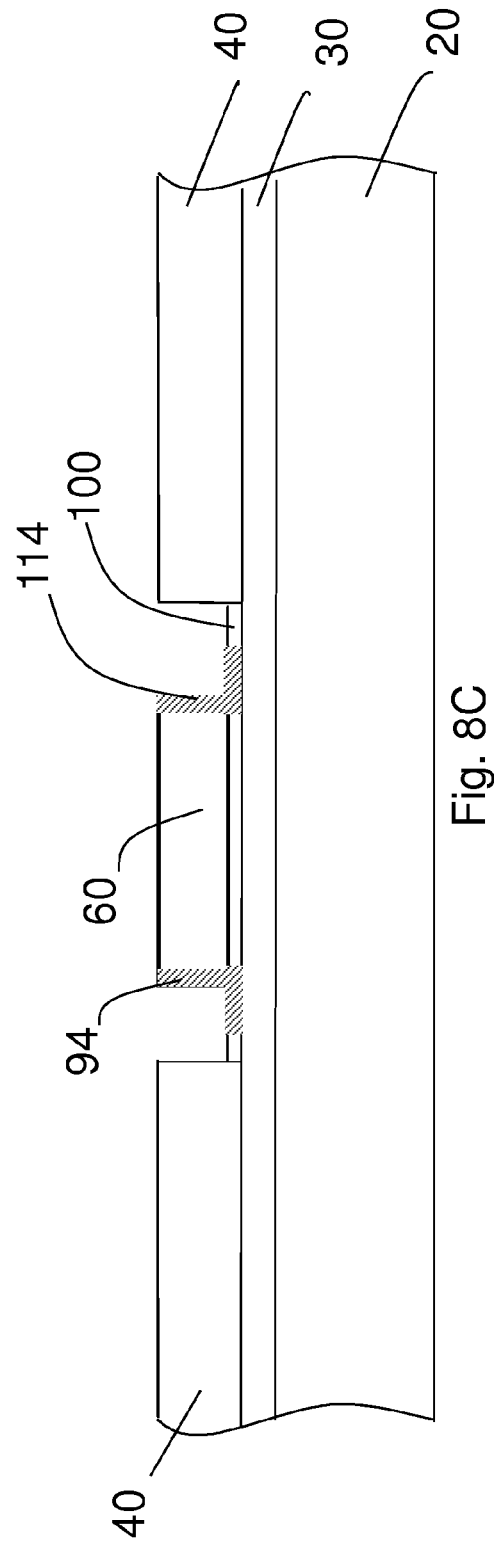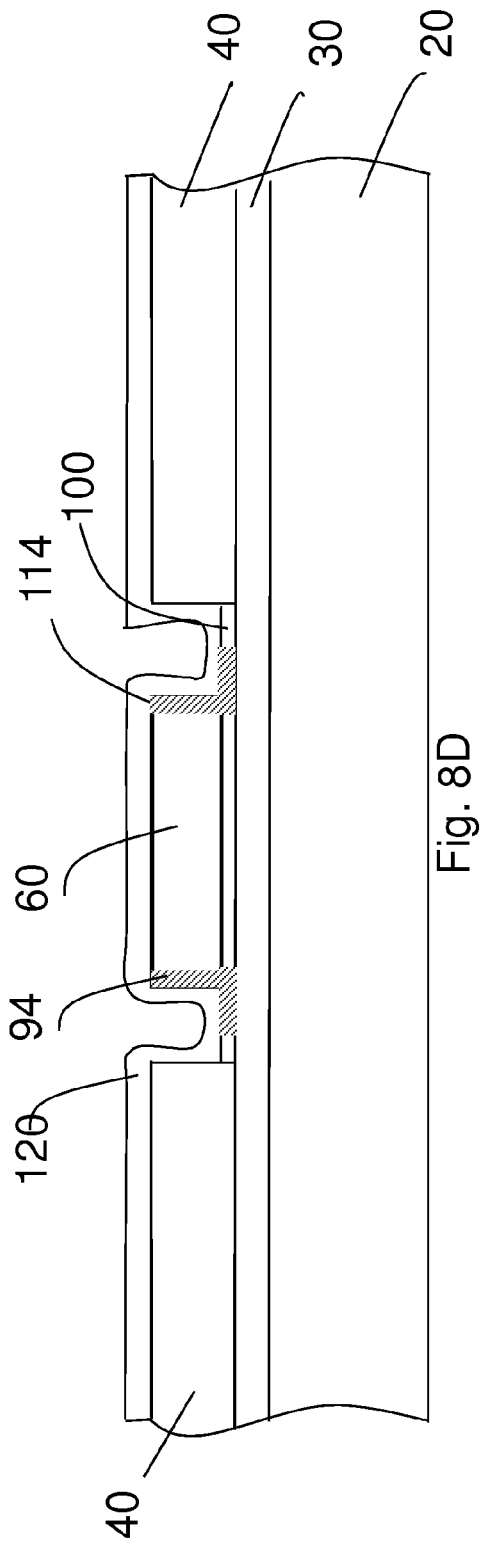

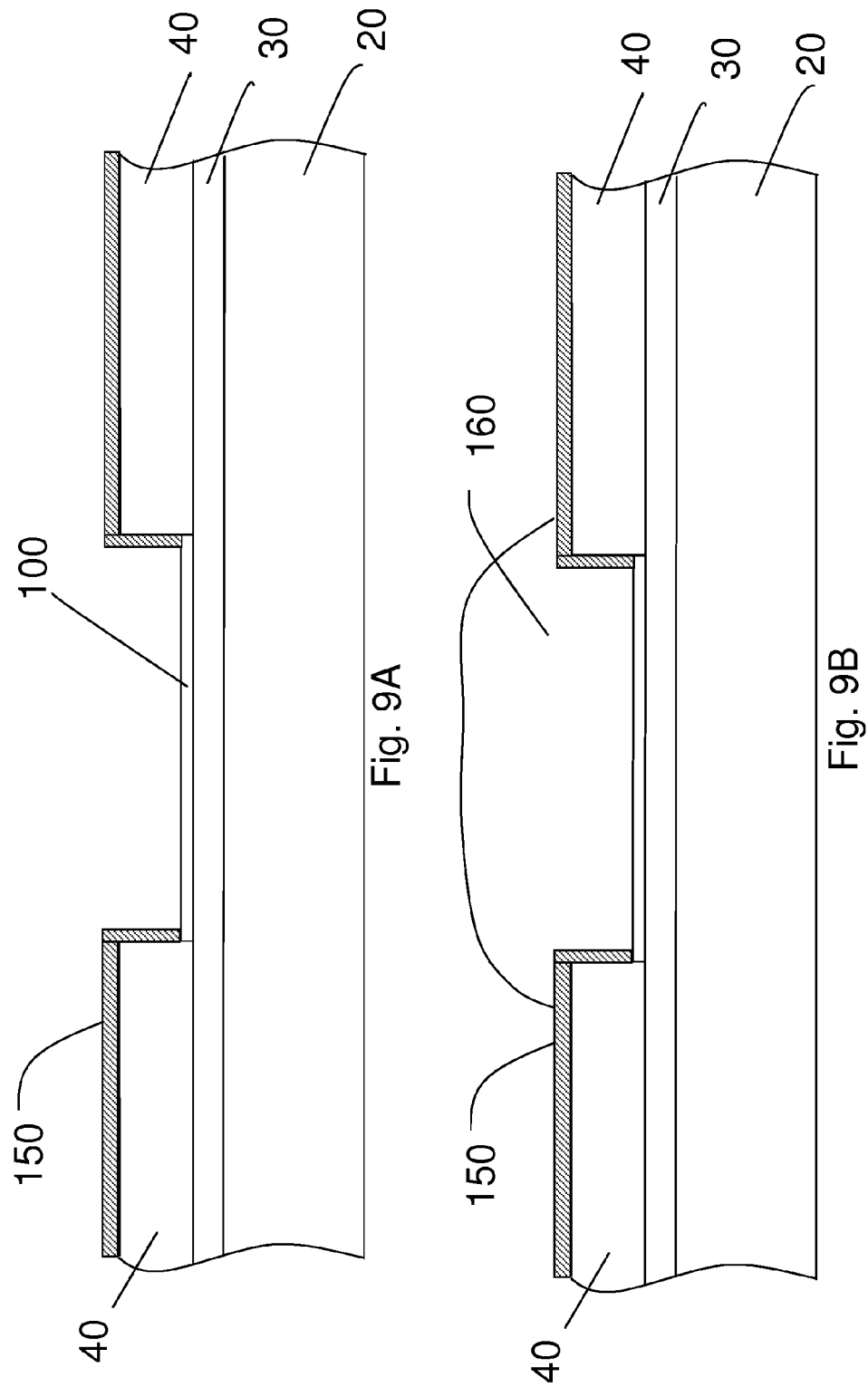

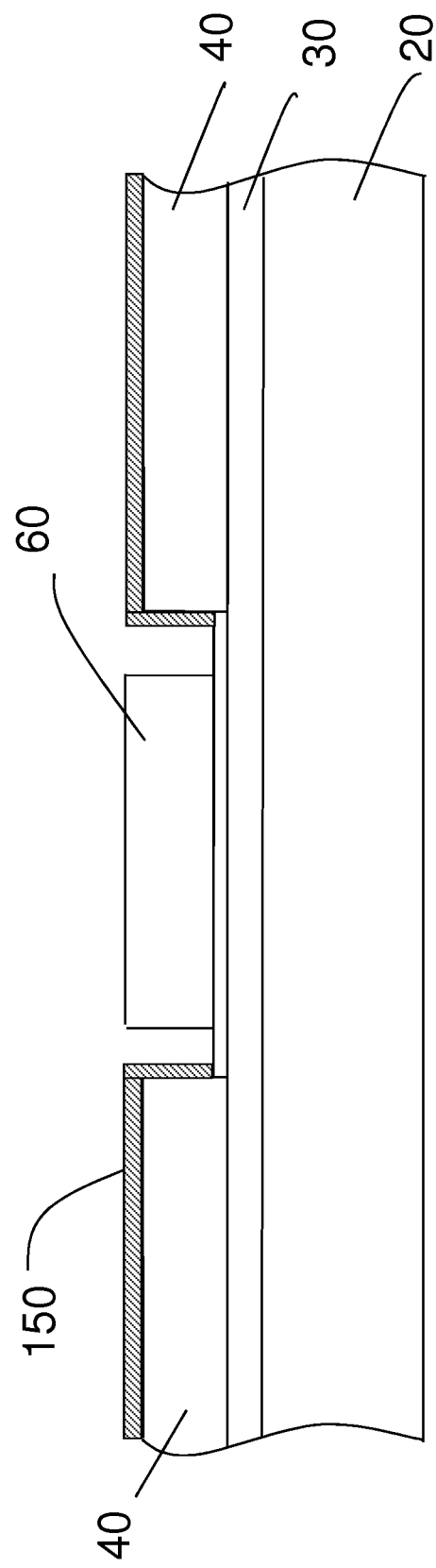

WAVEGUIDE END-COUPLED INFRARED DETECTOR

BACKGROUND OF THE INVENTION

1. Field of the Invention

This invention relates to the field of infrared optical detectors, and in particular to optical waveguide end-coupled infrared detectors.

2. Description of the Related Art

Infrared detectors are key components for optical communication systems. They are responsible for performing the signal conversion from the optical to the electrical domain at the receiver end. An optical waveguide is an elongated structure having a 2-dimensional cross-sectional pattern, which guides light inside it like a water conduit carries water inside. Since modern optical signal processing is often realized by waveguide based devices in contrast to the traditional bulk optics, waveguide detectors are important components of such systems. As a receiver end device, waveguide end-coupled infrared detector is expected to reduce the receiver form factor, reduce cost and improve the receiver performance.

In an optical communication system, the infrared detectors are typically made of p-n junction based photodiodes (PDs). Traditional PDs are designed to be normal incident type. The PD's high speed performance is limited by the trade-off between speed and responsivity, where responsivity represents the conversion efficiency of light to electrical signal. If the light absorption layer of a PD is thicker, more light could be converted to the electrical signal under a static bias condition; however, photo-generated carriers have to travel a longer distance to reach the top and bottom p or n contact, which means a slower device. A waveguide based PD can offer a solution to this limitation by decoupling light absorption and carrier drifting paths. This is normally achieved by designing the photo-carrier collection electrical field inside the light absorption material to be perpendicular to the direction of waveguide, i.e. the direction of light propagation. However, in order to make the photo-detector fast enough, the lateral dimension, i.e. either the width or thickness of the waveguide needs to be small. For a modern 10 Gbps detector, this thickness is roughly limited to be about 1-2 μm. This smaller lateral dimension increases the difficulty of fiber coupling to the waveguide device.

Waveguide detectors, owing to their smaller cross-sectional dimension, are typically used in high speed (10 Gbps or higher), long wavelength (1250-1610 nm) infrared communications. These detectors typically comprise a light carrying medium and a light absorbing medium, most commonly, both in waveguide format. In these applications, light signal is typically carried in a single mode fiber (SMF). In a typical configuration, light from a SMF is end-coupled into a signal-carrying waveguide, from where it enters the light absorbing medium. When a fiber is connected to a waveguide, loss of light happens due to the mode mismatch between a single-mode-fiber and the optical mode inside a waveguide. If a waveguide detector is to perform efficient optical to electrical signal conversion, it needs to receive as much light from the fiber as possible and convert the optical to electrical signal at a high enough speed. As pointed out earlier, there is a trade-off between the SMF to waveguide connection and the device speed. A typical solution to this challenge is to design a waveguide with large lateral dimension on one end, and smaller lateral dimension on the opposite end, which is the end connecting to the light absorbing material. The large-lateral-dimension waveguide has a good mode-matching property to the SMF; the smaller lateral dimension end can facilitate a faster device. A mode convertor is needed to shape the light from one end with large mode cross-section, to the other end with a much smaller cross-section. Due to the limitation in silicon device processing, mode convertor is a difficult technology to implement.

Germanium is a material fully compatible to the standard complementary metal-oxide-semiconductor (CMOS) process and absorbs light up to 1600 nm optical communication wavelength range. High speed waveguide integrated Ge PDs have been extensively studied in the past decade. Most of the work is focused on sub-micron core or small core silicon-on-insulator (SOI) waveguides. However, inefficient coupling to SMF limits their practical deployment in real optical networks. Large core waveguides have the advantage of easy fiber coupling. So far, there are no demonstrated Ge waveguide PD in fiber matched mode size that can operate at 10 Gbps or higher speed owing to the long carrier drift time in large structures.

SUMMARY OF THE INVENTION

Accordingly, the present invention is directed to a waveguide end-coupled infrared detector and related fabrication method that substantially obviates one or more of the problems due to limitations and disadvantages of the related art.

An object of the present invention is to provide a new approach to realize faster than 10 Gbps waveguide integrated Ge PD in SMF-mode matched dimensions.

A waveguide end-coupled infrared detector is provided. The detector includes a silicon-on-insulator (SOI) substrate, and at least one signal carrying silicon waveguide formed on the substrate. The detector further includes at least one Ge waveguide detector formed on the afore-mentioned substrate, which absorbs the infrared signal light and converts the optical signal to electrical signal at a high speed. The at least one silicon waveguide is in optical communication with the at least one Ge waveguide. The dimension of the at least one silicon waveguide is configured to match the mode of a single-mode glass fiber, which incurs minimal amount of optical loss, when the silicon waveguide is butt-coupled to a single mode fiber.

The at least one silicon waveguides may include at least one taper to reduce or expand the optical mode inside the silicon waveguide before the light enters into the at least one Ge waveguide detector. The least one Ge detector can be epitaxially grown onto the SOI substrate.

One facet of the Ge waveguide facing the silicon waveguide or a facet of the silicon waveguide facing the Ge waveguide may be doped to either P-type or N-type; the other facet of the Ge waveguide may be doped in an opposite type. An electrical field parallel to the direction of light propagation inside the Ge waveguide may be established inside the Ge waveguide to collect photo-generated carriers, by providing a voltage across the two doped end facets (electrodes) of the Ge waveguide.

A method of detecting light signal in a silicon waveguide is provided. The method includes providing an optical system with a light-signal-carrying silicon waveguide disposed on top of a silicon-on-insulator (SOI) substrate. The optical system further includes a Ge waveguide formed by depositing Ge film onto the SOI substrate and pattern the Ge film to a waveguide. The Ge and silicon waveguides are in optical communication with each other. The method further includes doping the two end facets of the Ge detector with opposite doping types. The method further includes applying a voltage across the two end facets of the Ge waveguide, creating an electrical field inside the Ge waveguide, in parallel to the direction of light propagation, to collect photo-generated carriers inside the Ge waveguide.

A method of fabricating a waveguide infrared detector is provided. The method includes providing a SOI substrate and forming at least one silicon waveguide into the SOI substrate. Forming the at least one silicon waveguide includes photo-lithography followed by reactive ion etching. The method further includes depositing a Ge film onto the SOI substrate and forming a Ge waveguide by using photo-lithography followed by reactive-ion etching.

The device and method according to embodiments of the present invention couple the device speed with light absorption, similar to the conventional surface normal photo-detector in exchange for a good coupling to SMF, eliminating the need for an optical mode convertor.

It is to be understood that both the foregoing general description and the following detailed description are exemplary and explanatory and are intended to provide further explanation of the invention as claimed.

BRIEF DESCRIPTION OF THE DRAWINGS

FIG. 1A schematically illustrates a trimetric view of a Ge waveguide detector in accordance with an embodiment of the present invention.

FIG. 1B schematically illustrates a cross-sectional view of a portion of the Ge waveguide detector of FIG. 1A along the dashed line labeled 1B-1B in FIG. 1A.

FIG. 3A schematically illustrates a trimetric view of the waveguide detector structure after the formation of Ge and Si waveguide structures.

FIG. 3B schematically illustrates a cross-sectional view of the waveguide detector structure FIG. 3A, taken along dashed line labeled 3B-3B.

FIG. 3C schematically illustrates a cross-sectional view of the waveguide detector structure FIG. 3A, taken along dashed line labeled 3C-3C.

FIG. 5C schematically illustrates a portion of the Ge detector of FIG. 5A, taken along the dashed line labeled 5C-5C.

FIG. 8A-D schematically illustrate a process flow using a series of cross-sectional views of the formation of an infrared waveguide detector in an alternative configuration from that of FIG. 1A.

FIG. 9A-C schematically illustrate a process flow using a series of cross-sectional views of the formation of an infrared waveguide detector in another alternative configuration from that of FIG. 1A.

DETAILED DESCRIPTION OF THE PREFERRED EMBODIMENTS

Figure 2A:
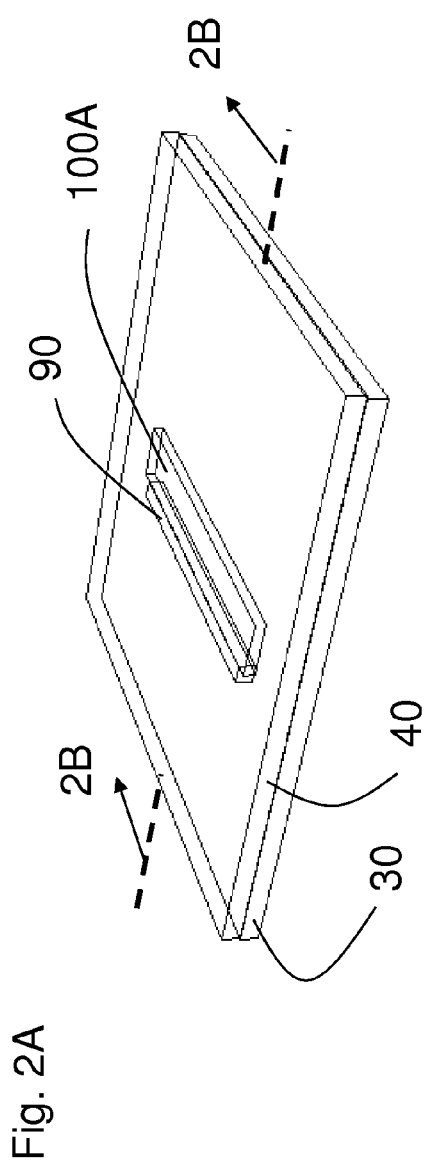
FIG. 2A Schematically illustrates a trimetric view of the waveguide detector structure after a pit is etched into a Silicon-on-insulator (SOI) substrate, and one sidewall of the SOI pit is doped with N or P-type dopant.
Figure 2B:
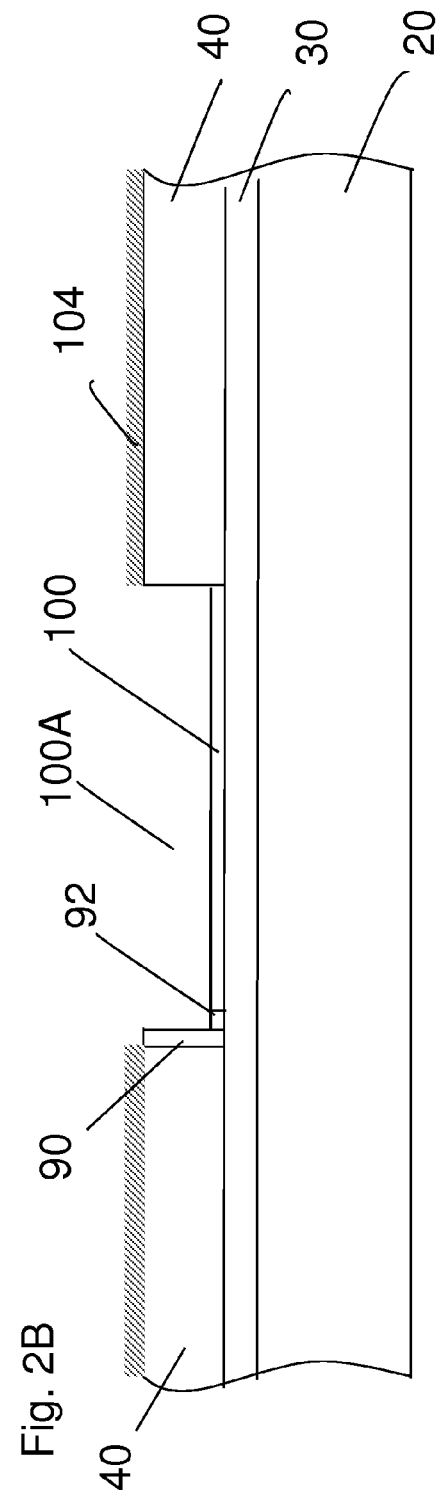
FIG. 2B schematically illustrates a cross-sectional view of the waveguide detector structure along the dashed line labeled 2B-2B in FIG. 2A.

Large size and high speed are usually two contradictory requirements in photonic integrated circuit. Larger dimension (waveguide width and height) waveguides can in general have a better mode match to a single mode fiber (SMF). The latter serves as the common linkage of different photonic devices in an optical system, particularly for metro and long-haul applications. Since carriers inside a semiconductor device generally have a transit speed limit, smaller device dimension (along the direction of carrier movement) facilitates a faster working device. With respect to a waveguide based infrared detector, the system and methods according to embodiments of this invention configure the photo-carrier collection electrical field inside the waveguide detector to be substantially parallel to the direction of the light propagation inside the waveguide, similar to the case of a surface-normal detector, in exchange, high speed signal detection can be achieved in a SMF mode matched waveguide, without the complication of an optical mode convertor.

According to one embodiment, the optical device comprise a silicon on insulator (SOI) substrate, in which the light signal carrying waveguide can be made of a top silicon layer, with an oxide layer residing between the top silicon layer and the underlying substrate, which can also be a silicon layer. Due to the presence of this buried oxide layer, and a layer of dielectrics which is deposited on top of the top-silicon-layer as the upper cladding of the waveguide, light signal is guided in the top silicon layer of the substrate.

Several exemplary waveguide infrared detectors and exemplary methods of using and fabricating such devices are disclosed in more detail below. The details of the following description, made with reference to the accompanying drawings, may be found individually or combined with one another in various permutations and subsets in accordance with the systems and methods disclosed herein. The exemplary systems and methods may, however, be embodied in many different forms and should not be construed as being limited to any one particular example set forth herein. As used herein, "forming" a structure shall be given its broadest ordinary meaning, including but not limited to performing steps to make the structure or providing the structure already premade. As used herein, the term "layer" shall be given its broadest ordinary meaning including but not limited to a layer comprising a single material and having a generally uniform thickness or a varying thickness, or multiple sub-layers each comprising a different material and each having either a uniform thickness or a varying thickness. In the drawings, the thicknesses of the layers and the widths of certain parts are exaggerated for clarity.

FIG. 1A schematically illustrates a trimetric view of an exemplary optical device 10 in accordance with an embodiment of the present invention. FIG. 1B schematically illustrates a cross-sectional view of a portion of the optical device 10 of FIG. 1A along the dashed line labeled 1B-1B in FIG. 1A. The optical device 10 is shown in FIG. 1B with a different angle of view and with features having different relative scales as those in FIG. 1A to show various details. The optical device 10 includes a layer of silicon material 40, residing on top of buried oxide layer 30, which sits on top of a silicon substrate layer 20. Layer 20 is not shown in FIG. 1A but is shown in FIG. 1B for the sake of clarity. Part of layer 40 is shaped to a waveguide shape structure 50 through standard lithography and reactive ion etching, forming a cross-section with a ridge or rectangular shape. A Ge waveguide structure 60 is formed on top of a thin silicon layer 100, formed by etching away part of the silicon layer 40 and leaving a thin layer of silicon 100, followed by Ge deposition. The Ge waveguide 60 is configured to receive signal lights coming out of the waveguide 50. As shown in FIG. 1B, two doped areas 90 and 110, located at the two end facets of Ge waveguide 60, are doped to P and N types to facilitate the contact to the Ge. The P and N types of the two doped areas can be swapped. In this embodiment, the first doped area 90 is formed by doping the Si and the second doped area 110 is formed by doping the Ge, as will be described in detail later. A metal contact 70 is made to region 110 on the side, and the metal traces extend itself to the top of silicon layer 40 to facilitate testing or packaging. The metal contact layer 70 on the Ge facet 110 serves as a light reflector, reflecting unabsorbed signal light back into the Ge waveguide. Contact to the region 90 is located on the layer 100, which will be explained in more details later when the fabrication steps are discussed. Exemplary thickness of the silicon substrate layer 20 is 200 to 2000 microns, exemplary thickness of the oxide layer 30 is 0.375 to 5 microns, and exemplary thickness of the silicon layer 40 is 0.375 to 13 microns.

The at least one signal carrying silicon waveguide 50 can include an array of optical waveguides 50 residing on the oxide layer 40; the at least one Ge waveguide 60 can include an array of optical waveguides 60 residing on the thin silicon layer 100. The typical width of the at least one silicon waveguide 50 is 13 to 0.5 microns, and the width range of the at least one Ge waveguide is 13 to 0.5 microns. In FIG. 1A, a taper 52 is formed to connect the Si waveguide 50 to the Ge waveguide 60. Although in the FIG. 1A the Ge waveguide 60 is shown as being narrower than the Si waveguide 50, this transition is not necessarily required; in general the Ge waveguide 60 can be wider, equal to, or narrower than the Si waveguide 50, and the adoption of down or up taper mainly depend on the ease of processing.

FIGS. 2A-5C schematically illustrate an exemplary process flow using a series of trimetric and cross-sectional views of the optical device 10 according to an embodiment of this invention. FIG. 2A is a trimetric view of a portion of a starting SOI wafer showing the top silicon layer 40 and the buried oxide 30; the substrate 20 is omitted in this view for the sake of simplicity. At least one hole (pit) 100A is etched into the silicon layer 40 using standard photo lithography and reactive-ion-etching process. A thin oxide or nitride layer 104 may be used as the dry etch hard mask (not shown in FIG. 2A). Exemplary thickness of the layer 104 may be 0.2 to 5 microns. An angled implantation of either P or N-type dopant is introduced onto one sidewall of the Si pit 100A, forming a region 90 shown in FIG. 2A. P-type dopants may be boron and BF2, and N-type dopants may be phosphorous, arsenic, or antimony. With proper masking, a portion of the bottom Si layer 100 will be doped as well, as indicated by region 92 in FIG. 2B. FIG. 2B is a cross-sectional view of the device in FIG. 2A along the line labelled 2B-2B. This region 92 extends the electrical connection to the sidewall of the Si pit 100A, to an area on layer 100, which will be used for metal contact in the down-stream processing.

FIG. 3A is a trimetric view of the device 10 being fabricated, after the patterning of both the silicon and Ge waveguide. FIG. 3B is a cross-sectional view of the device in FIG. 3A along the cutline labelled 3B-3B. FIG. 3C is a cross-sectional view of the device in FIG. 3A along the line labelled 3C-3C. Following the device fabrication step shown in FIG. 2A, Ge is deposited into pit 100A of FIG. 2A to form a planarized structure. The oxide or nitride hard mask 104 used during the silicon pit etch may be used as the masking layer. Possible processes include selectively epitaxial growth of Ge onto the silicon layer 100, or deposit polycrystalline Ge with very tiny grains onto the silicon seed layer 100 and conduct epitaxial regrowth. Another option is to non-selectively grow Ge into the silicon pit, and remove the polycrystalline Ge sitting on top of the hard mask 104 using chemical-mechanical polishing. The height of the Ge film may be slightly higher than the surface of the Si layer 40, and chemical or mechanical polishing technique may be used to level the height of the Ge film to be very close to the surface of the Si layer 40, using the layer 104 as the polishing stop. To pattern the Si layer and Ge layer into waveguide shape, the remaining materials of the layer 104 is removed by either Buffer-oxide-etchant (BOE) for oxide or $H_3PO4$ for nitride. A new layer of hard-mask 106, e.g. silicon dioxide, is deposited onto the device surface in the thickness range of 0.5 to 5 micron, and photo-lithography step and reactive-ion-etching may be used to pattern the hard-mask 106 and then the hard-mask 106 layer is used as the etching mask to pattern the silicon waveguide 50 and Ge waveguide 60 simultaneously. FIG. 3C shows the cross-sectional view of the silicon waveguide 50, where the etch-depth t1 is typically ⅓ to ½ of the layer 40 thickness. In one embodiment, the optical mode of waveguide 50 is matched to a single-mode-fiber mode.

Figure 4A:
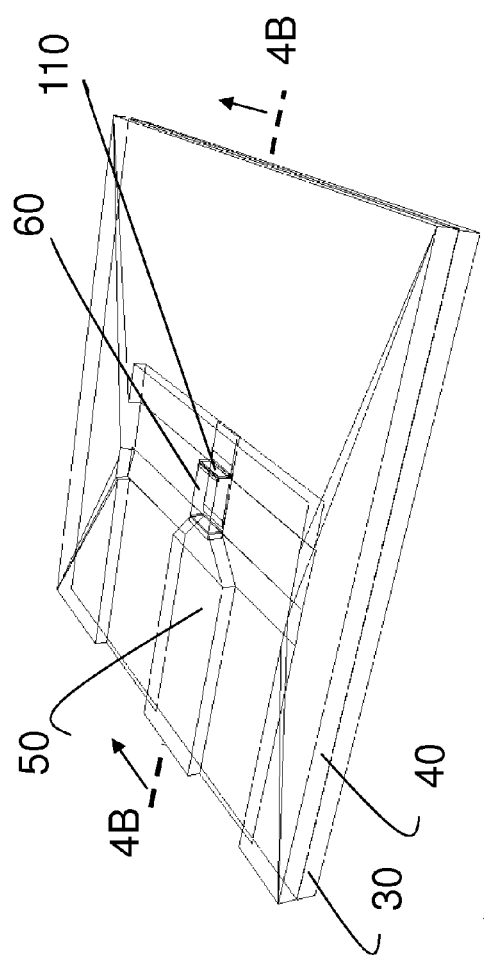
FIG. 4A schematically illustrates a trimetric view of the waveguide detector structure after the formation and doping of the Ge end facet.
Figure 4B:
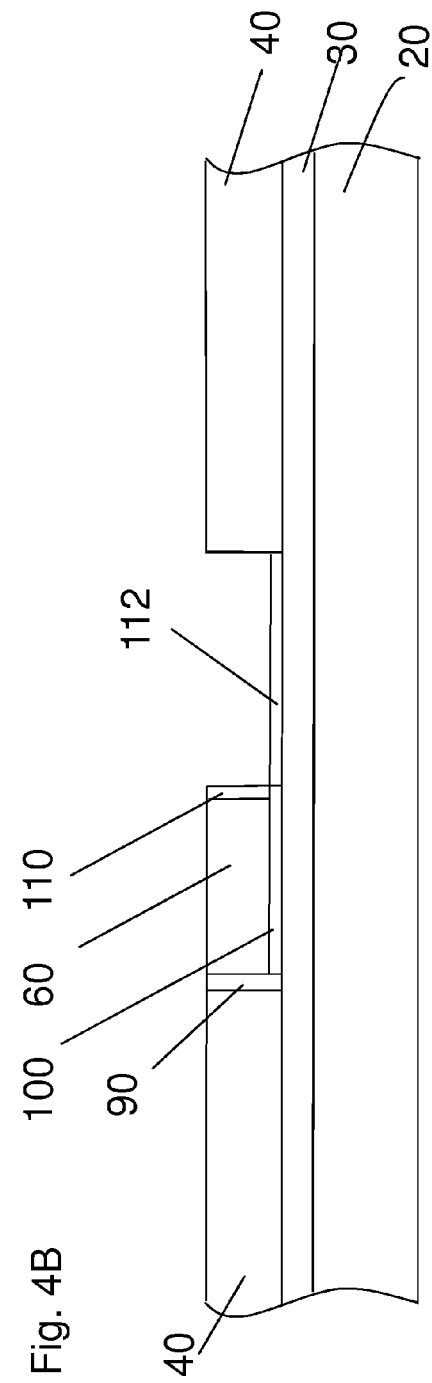
FIG. 4B schematically illustrates a portion of the Ge detector of FIG. 4A, taken along the dashed line labeled 4B-4B.

Using standard photo-lithography and angled implantation, the second facet 110 of the Ge waveguide 60 (the one located away from the Ge/Si interface) may be doped to an opposite type of the Ge/Si interface as shown in FIG. 4A. A portion of the silicon layer 100 is doped simultaneously forming region 112. FIG. 4B is a cross-sectional view of the device in FIG. 4A, taken along dashed line labelled 4B-4B.

Figure 5A:
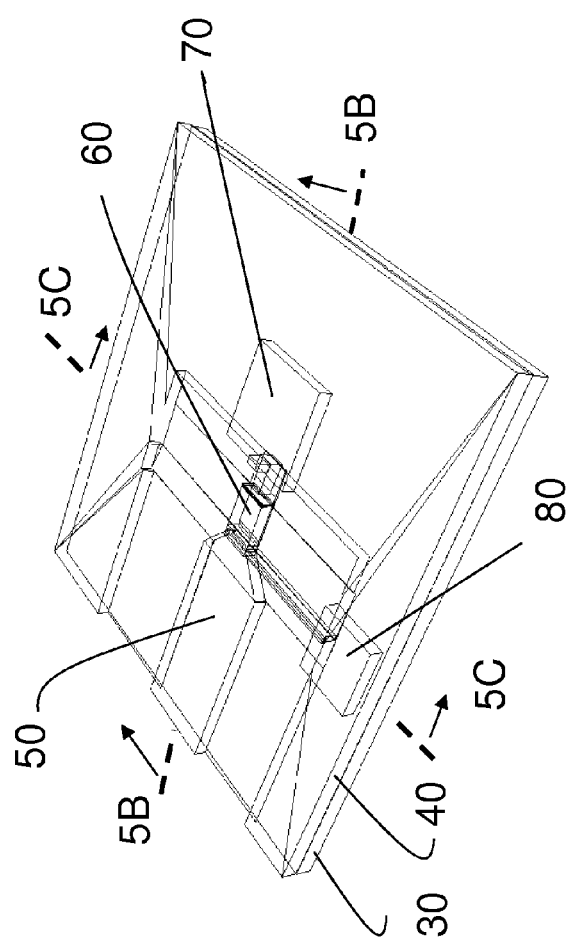
FIG. 5A schematically illustrates a trimetric view of the waveguide detector structure after the formation of metal contact and pads.
Figure 5B:
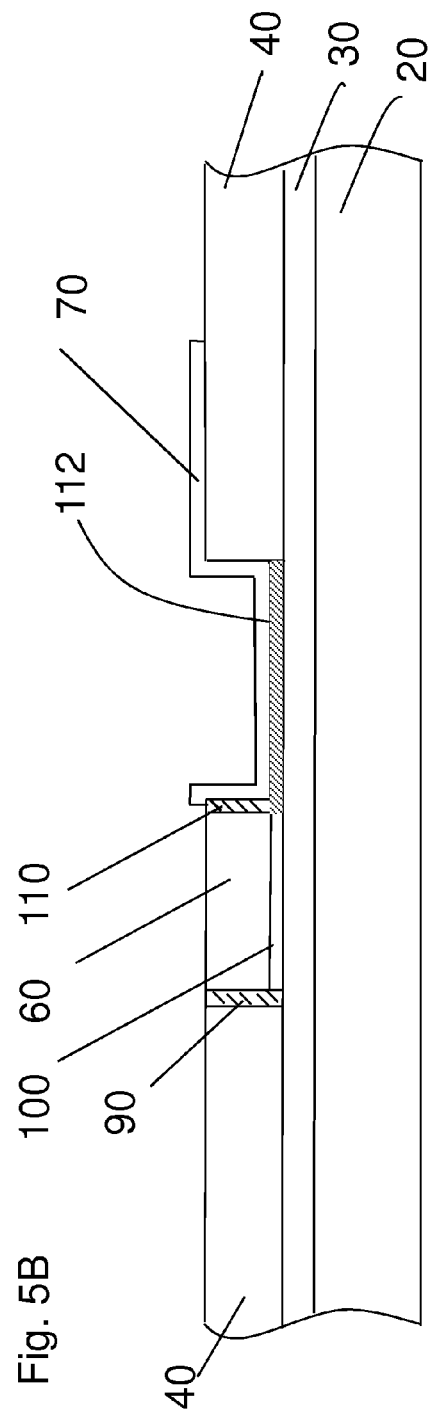
FIG. 5B schematically illustrates a portion of the Ge detector of FIG. 5A, taken along the dashed line labeled 5B-5B.

Metal contact 70 to the Ge facet 110 and doped silicon region 112 can be made simultaneously through standard dielectric deposition, contact patterning, metal sputtering and metal reactive etching steps, forming the final device as illustrated in a trimetric viewgraph FIG. 5A. Metal contact 70 to the Ge facet 110 sits on the surface of layer 110, as shown in FIG. 5B, which is a cross-section of the device in FIG. 5A taken along the line labelled 5B-5B. Metal contact 80 to the doped region 90 sits on the surface of layer 100, as depicted in FIG. 5C, which is a cross-section of the device in FIG. 5A taken along the line labelled 5C-5C, in the direction of the arrows.

To summarize, the Ge waveguide 60 generally has two facets perpendicular to the direction of light propagation; the near-end facet is close to the light exiting end of the silicon waveguide 50, and the far-end facet is the facet away from the light exiting end of the silicon waveguide. The far-end Ge facet and the Si region at the Si/Ge interface (at the near-end Ge facet) are doped with opposite doping types of P or N, forming a p+-i-n+, p+-p-n+, or p+-n-n+diode inside the Ge waveguide and the adjacent Si region. An electrical field can be established inside the Ge waveguide via the two doped regions.

Figure 6:
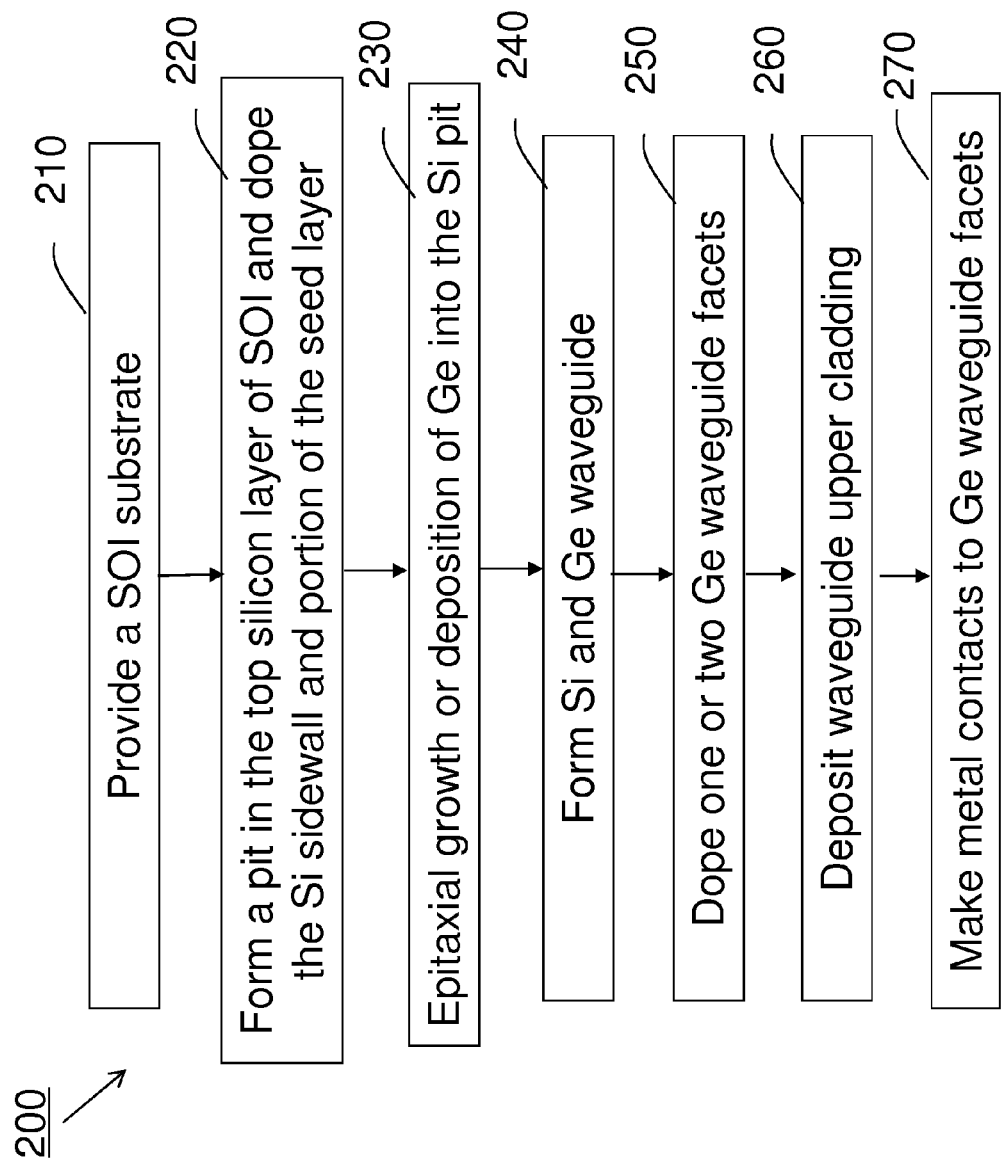
FIG. 6 is a flow diagram illustrating a method to fabricate a Ge waveguide detector in accordance with an embodiment of the present invention.
Figure 7:
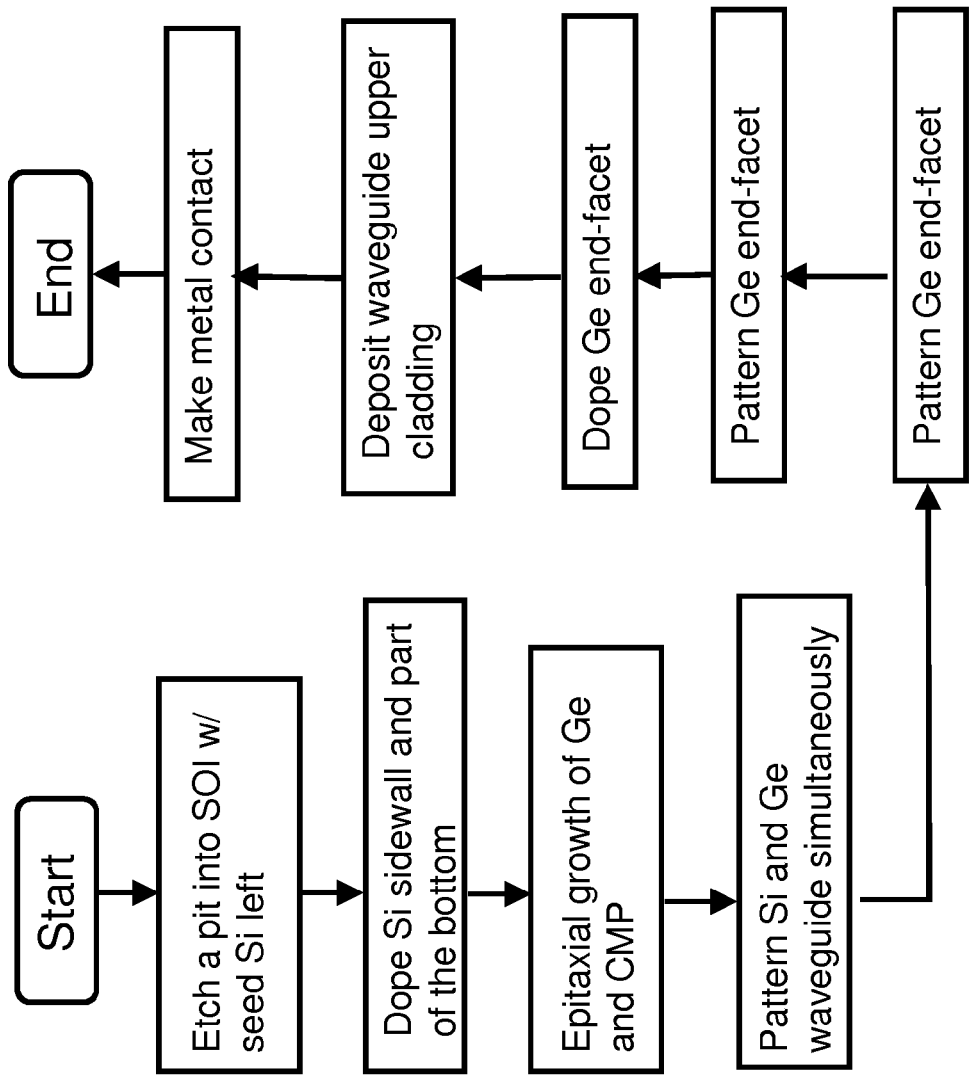
FIG. 7 schematically illustrate a process flow for fabricating a waveguide infrared detector of FIG. 1A.

FIG. 6 is a flow diagram of an exemplary method 200 of fabricating the optical system 10 in accordance with an embodiment of the present invention. FIG. 7 is another flow diagram of essentially the same process. While the method 200 is described by referring to the components and structures disclosed above, the method 200 is compatible with other structures and combinations of components than those disclosed above. First, an SOI substrate is provided (process 210). A pit 100A is formed in the top silicon layer of the SOI substrate, and the Si sidewall of the pit and a portion of the Si seed layer 100 are doped (process 220). Using epitaxial growth or deposition, a Ge layer is formed into the silicon pit 100A (process 230). Si waveguide 50 and Ge waveguide 60 are then formed (process 240). The other Ge waveguide facet 110 is doped with dopant of opposite type as the Si sidewall 90 (process 250). A layer of dielectric material is formed over the silicon top surface to form an upper cladding layer of the waveguide (process 260). Metal contacts are formed for connecting to the two doped regions 90 and 110 located at the two Ge waveguide facets (process 270).

The various processes of the method 200 can each include one or more steps or sub-processes. The various processes can be performed in the order shown in FIG. 6 or other suitable orders. Furthermore, the steps or sub-processes of one process can be performed simultaneously or concurrently with one another, or can be interleaved with one or more steps or sub-processes of one or more other processes. In addition, one or more steps or sub-processes of one or more processes can be used to form multiple structures that are shown in FIG. 6 as being formed by separate processes.

In another embodiment, the Ge waveguide is still configured to receive light from the silicon waveguide, but a gap is created in between the silicon waveguide facet (end) and the Ge waveguide facet (end). As illustrated in FIG. 8A, after a pit is etched into the SOI top layer 40, a layer of oxide 132 is used as the epitaxial growth hard mask during the Ge film deposition process. Since the Si pit sidewalls 170 are exposed, Ge epitaxial growth occurs concurrently on both the surface of sidewall 170 and the surface of bottom Si layer 100; as a result, not only threading dislocation 140 will originate from the surface of 100 and 170, stacking fault 130 is likely to be generated when Ge layered growth initiated from two perpendicular surfaces meet each other. These defects, namely threading dislocations and stacking faults, will serve as sources of dark current when a reverse bias is applied onto the Ge detector, and adversely affect the performance of the detector. As depicted in FIG. 8B, one solution is to etch the defective area away, therefore leaving a gap between the silicon waveguide (light exiting end) and the Ge waveguide facet (light entering end). As shown in FIG. 8C, angled implantation may be used to dope one Ge facet 94 to one polarity, and the other Ge facet 114 to another polarity, e.g. if facet 94 is doped to P-type, then facet 114 is doped to N-type. A layer of anti-reflective coating 120 may be deposited in the gap to reduce back-reflection, when the light signal exit the Si waveguide 50 and entering the Ge waveguide 60.

To alleviate the threading dislocation from the silicon pit sidewall 170 as shown in FIG. 8A, an alternative approach is to cover the sidewall 170 with a thin layer of oxide to suppress the Ge epitaxial growth. As illustrated by FIG. 9A, in another embodiment of the current invention, a layer of dielectric, e.g. oxide, silicon-oxy-nitride, or nitride 150 is deposited over the top of the Si layer 40 and on the sidewall of the silicon pit as shown in FIG. 8A, before the Ge epitaxial growth. Then selective Ge epitaxial growth over silicon may be conducted, using layer 100 as a seed layer, and a mushroom shape Ge 160 is grown in the pit and partially over the silicon waveguide layer 40. After chemical-mechanical-polishing, the Ge 160 surface can be close to the height of the silicon layer 40. Then the Ge may be patterned using photo-lithography and reactive-ion-etching to a shape similar to that shown in FIG. 8B, which is shown in FIG. 9C. Downstream processing is similar to that shown in FIGS. 8C & 8D.

To summarize, the Ge waveguide 60 generally has two facets perpendicular to the direction of light propagation; the near-end facet is close to the light exiting end of the silicon waveguide, and the far-end facet is the facet away from the light exiting end of the silicon waveguide. The two Ge facets are doped with opposite doping types of P or N, forming a p+-i-n+, p+-p-n+, or p+-n-n+diode inside the Ge waveguide. An electrical field can be established inside the Ge waveguide via the two doped regions.

Various configurations have been described this far. Although this invention has been described with reference to these specific configurations, the descriptions are intended to be illustrative of the invention and are not intended to be limiting. Various modifications, combinations of the various features, and applications may occur to those skilled in the art without departing from the true spirit and scope of the invention as defined in the appended claims.

What is claimed is:

1. An optical device comprising:
a silicon waveguide configured to guide a light, disposed on a silicon material substrate; and
a Ge waveguide, disposed on the silicon substrate, configured to receive at least a portion of the light from the signal-carrying silicon waveguide;
wherein either a near-end facet of the Ge waveguide which faces the silicon waveguide or a first facet of the silicon waveguide which faces the Ge waveguide is doped to a first polarity, and a far-end facet of the Ge waveguide which faces away from the silicon waveguide is doped to a second polarity opposite the first polarity, to establish an electrical field parallel to a light propagation direction inside the Ge waveguide to collect photo-generated carriers.

2. The optical device of claim 1, wherein the silicon material substrate is a silicon-on-insulator (SOI) structure.

3. The optical device of claim 1, further comprising a metal contact layer on the far-end Ge facet, the metal contact layer reflecting unabsorbed signal light back into the Ge waveguide.

4. The optical device of claim 1, further comprising a contact layer formed on the silicon substrate and connected to the doped near-end facet of the Ge waveguide or the doped first facet of the silicon waveguide.

5. The optical device of claim 1, wherein the near-end facet of the Ge waveguide and first facet of the silicon waveguide define a gap between them and the near-end facet of the Ge waveguide is doped.

6. The optical device of claim 5, further comprising a film stack formed onto the near-end facet of the Ge waveguide, to reduce back-reflection of light entering the Ge waveguide from the silicon waveguide.

7. The optical device of claim 6, further comprising a film stack formed onto the first facet of the silicon waveguide, to reduce back-reflection of light exiting the silicon waveguide.

8. The optical device of claim 5, wherein the first facet of the silicon waveguide is covered by dielectrics to suppress crystal growth initiated from the first facet of the silicon waveguide.

9. The optical device of claim 1, wherein the near-end facet of the Ge waveguide and the first facet of the silicon are in contact with each other, wherein the first facet of the silicon waveguide is doped, wherein a portion of the silicon substrate under the Ge waveguide and in contact with the first facet of the silicon waveguide is doped, and
wherein the optical device further comprises a metal contact connected to the doped portion of silicon substrate.

10. A method of detecting light signal, the method comprising:
- providing an optical system comprising a silicon substrate, at least one silicon waveguide patterned into the silicon substrate, and at least one Ge waveguide disposed on the silicon substrate;
- providing an electrical field inside the Ge waveguide between two opposite ends of the Ge waveguide which is parallel to a light propagation direction inside the Ge waveguide; and
- transmitting light between the at least one silicon waveguide and the at least one Ge waveguide, wherein at least a portion of the light signal in the silicon waveguide enters into the Ge waveguide and is absorbed to generate photo-generated carriers, and wherein the photo-generated carriers are collected by the electrical field to reach electrodes located at the two opposite ends of the Ge waveguide.

11. A method of fabricating an optical system, the method comprising:
- providing a silicon substrate;
- forming a silicon waveguide extending along at least a portion of the silicon substrate;
- forming a Ge waveguide extending along at least a portion of the silicon substrate, the Ge waveguide having a near-end facet which faces the silicon waveguide and a far-end facet which faces away from the silicon waveguide; and
- doping the near-end and far-end facets of the Ge waveguide using angled implantation to form first and second electrodes.

12. The method of claim 11, wherein the silicon substrate is an SOI substrate, and wherein the step of forming the silicon waveguide comprises:
- etching a top silicon layer of the SOI substrate forming a cross-section with a ridge or rectangular shape; and
- covering the silicon top surface with dielectric materials as an upper cladding layer.

13. The method of claim 12, wherein the step of forming the Ge waveguide comprises:
- etching a pit into the top silicon layer of the SOI substrate;
- depositing a Ge film or selectively growing a Ge film onto the bottom of the pit;
- chemical-mechanical-polishing the Ge film so that a top surface of the Ge film has a same height as or is higher than a top surface of the silicon waveguide; and
- reactive-ion-etching the Ge film to define its shape.

14. The method of claim 13, wherein the step of reactive-ion-etching of the Ge film comprises etching away at least a portion of the Ge film to form a gap between a sidewall of the silicon pit and the near-end facet of the Ge waveguide.

15. The method of claim 14, further comprising, prior to the step of depositing a Ge film or selectively growing a Ge film onto the bottom of the pit:
- covering a sidewall of the silicon pit by dielectrics to suppress crystal growth initiated from the silicon sidewall.

16. The method of claim 14, further comprising, after the step of etching away at least a portion of the Ge film:
- forming a film stack over the sidewall of the silicon pit and over the near-end facet of the Ge waveguide to reduce back-reflection of light exiting the silicon waveguide and to reduce back-reflection of light entering the Ge waveguide.

17. A method of fabricating an optical system comprising:
- providing a silicon substrate;
- etching a pit into a top layer of the silicon substrate;
- doping a portion of a sidewall of the pit and a portion of a bottom of the pit;
- depositing a Ge film or selectively growing a Ge film onto the bottom of the pit;
- pattern the top layer of the silicon substrate and the Ge film simultaneously to form a silicon waveguide and a Ge waveguide, wherein the Ge waveguide has a near-end in contact with the doped portion of the sidewall and a far-end facet; and
- doping the far-end facet of the Ge waveguide to a polarity opposite of a polarity of the doped portion of the sidewall.

18. The method of claim 17, wherein the silicon substrate is a silicon-on-insulator (SOI) structure.

19. The method of claim 17, wherein the step of doping a portion of a sidewall and the step of doping the far-end facet of the Ge waveguide are performed by angled implantation.

20. The method of claim 17, further comprising forming a metal contact to the doped portion of the bottom of the pit and a metal contact to the doped far-end facet of the Ge waveguide.

* * * * *